United States Patent
Tsai et al.

(10) Patent No.: US 8,861,197 B2
(45) Date of Patent: Oct. 14, 2014

(54) PORTABLE ELECTRONIC MODULE WITH BACK COVER CHANGING FUNCTION

(75) Inventors: Song-Nine Tsai, New Taipei (TW); Cheng-Shing Liu, New Taipei (TW); Jen-Hao Liu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 246 days.

(21) Appl. No.: 13/400,574

(22) Filed: Feb. 21, 2012

(65) Prior Publication Data

US 2013/0050974 A1   Feb. 28, 2013

(30) Foreign Application Priority Data

Aug. 22, 2011   (TW) .............. 100130007 A (51) Int. Cl.
   *G06F 1/16*   (2006.01)
(52) U.S. Cl.
   CPC ............ *G06F 1/1681* (2013.01); *G06F 1/1637* (2013.01)
   USPC ......... 361/679.55; 361/725; 361/807; 349/58
(58) Field of Classification Search
   CPC .............................. G06F 1/1681; G06F 1/1637
   USPC ..................................... 361/807, 679.55, 725
   See application file for complete search history.

(56) References Cited

U.S. PATENT DOCUMENTS

| | | | |
|---|---|---|---|
| 6,219,227 B1 * | 4/2001 | Trane ........................ | 361/679.27 |
| 6,347,044 B1 * | 2/2002 | Won et al. .................... | 361/807 |
| 6,373,537 B2 * | 4/2002 | Yun et al. ........................ | 349/58 |
| 6,421,231 B1 * | 7/2002 | Jung ........................ | 361/679.27 |
| 6,498,718 B1 * | 12/2002 | Kim et al. ................ | 361/679.58 |
| 6,501,641 B1 * | 12/2002 | Kim et al. ................ | 361/679.27 |
| 6,618,240 B1 * | 9/2003 | Kim ........................ | 361/679.07 |
| 7,403,377 B2 * | 7/2008 | Deluga .................... | 361/679.55 |
| 7,407,202 B2 * | 8/2008 | Ye et al. ..................... | 292/251.5 |
| 7,426,001 B2 * | 9/2008 | Lin .............................. | 349/58 |
| 7,428,142 B1 * | 9/2008 | Ligtenberg et al. ...... | 361/679.55 |
| 7,907,399 B2 * | 3/2011 | Kim et al. ................ | 361/679.55 |
| 7,936,559 B2 * | 5/2011 | Chen ........................ | 361/679.27 |
| 2003/0189681 A1 * | 10/2003 | Han et al. ........................ | 349/58 |
| 2005/0078439 A1 * | 4/2005 | Bovio et al. ................... | 361/681 |
| 2006/0023407 A1 * | 2/2006 | Ling ........................ | 361/683 |
| 2007/0171604 A1 * | 7/2007 | Hong et al. ................... | 361/683 |
| 2007/0273809 A1 * | 11/2007 | Lee ................................. | 349/58 |
| 2008/0102907 A1 * | 5/2008 | Komine .................... | 455/575.3 |
| 2008/0111942 A1 * | 5/2008 | Lee et al. ...................... | 349/58 |
| 2008/0117577 A1 * | 5/2008 | Kang et al. .................... | 361/681 |
| 2008/0285222 A1 * | 11/2008 | Yeo et al. ...................... | 361/681 |
| 2009/0231794 A1 * | 9/2009 | Bhutani .................... | 361/679.21 |
| 2010/0315570 A1 * | 12/2010 | Mathew et al. ................. | 349/58 |
| 2011/0091051 A1 * | 4/2011 | Thomason et al. .......... | 381/103 |

(Continued)

*Primary Examiner* — David M Sinclair
*Assistant Examiner* — Robert Brown
(74) *Attorney, Agent, or Firm* — Winston Hsu; Scott Margo (57) ABSTRACT

A portable electronic module includes a bezel, a glass panel device, a first limiting member, a backlight device, a second limiting member, and a back cover. The glass panel device is fixed onto the bezel. The first limiting member is disposed at a first side of the glass panel device. The backlight device is disposed on the glass panel device. The second limiting member is disposed at a second side of the glass panel device for limiting the backlight device cooperatively with the first limiting member. The back cover covers the backlight device and is detachably connected to the bezel for containing the glass panel device and the backlight device cooperatively with the bezel.

10 Claims, 9 Drawing Sheets

(56) References Cited

U.S. PATENT DOCUMENTS

| | | | |
|---|---|---|---|
| 2011/0096035 A1* | 4/2011 | Shen .............................. 345/175 |
| 2011/0157512 A1* | 6/2011 | Mishima ......................... 349/58 |
| 2011/0164365 A1* | 7/2011 | McClure et al. ........... 361/679.3 |
| 2011/0242434 A1* | 10/2011 | Hisada et al. ................. 348/739 |
| 2011/0261515 A1* | 10/2011 | Li et al. .................... 361/679.01 |
| 2011/0267751 A1* | 11/2011 | Shimo et al. ............. 361/679.01 |
| 2011/0317087 A1* | 12/2011 | Ling et al. ....................... 349/58 |
| 2012/0008061 A1* | 1/2012 | Jang et al. ....................... 349/58 |
| 2012/0014083 A1* | 1/2012 | Saito et al. .................... 361/807 |
| 2012/0162951 A1* | 6/2012 | Hamada ........................ 361/807 |
| 2012/0162952 A1* | 6/2012 | Tamura et al. ................ 361/807 |
| 2012/0176761 A1* | 7/2012 | Lee ................................ 361/807 |
| 2012/0206895 A1* | 8/2012 | Shirasaka et al. ............. 361/807 |
| 2012/0236515 A1* | 9/2012 | Matsumoto et al. .......... 361/752 |
| 2012/0250284 A1* | 10/2012 | Abe et al. ...................... 361/807 |
| 2012/0307475 A1* | 12/2012 | Morita et al. ................. 361/807 |
| 2013/0003339 A1* | 1/2013 | Chen et al. .................... 361/807 |
| 2013/0188305 A1* | 7/2013 | Mathew et al. .......... 361/679.27 |

* cited by examiner

PORTABLE ELECTRONIC MODULE WITH BACK COVER CHANGING FUNCTION

BACKGROUND OF THE INVENTION

1. Field of the Invention

The present invention relates to a portable electronic module, and more specifically, to a portable electronic module with a back cover changing function.

2. Description of the Prior Art

For a portable computer, a conventional configuration for a bezel, a back cover, and a liquid crystal module is to assemble the modularized liquid crystal module, related components (e.g. a dustproof film, a buffer film), and the bezel onto the back cover sequentially in a top-to-down manner. Accordingly, the liquid crystal module and the related components can be packaged between the bezel and the back cover.

However, in the said configuration, if a condition occurs that the back cover is needed to replace (e.g. a user wants to replace the back cover with another back cover of other different color according to his likes) or the back cover is damaged, the back cover can only be replaced after the bezel, the liquid crystal module and the related components are detached from the back cover sequentially, so as to cause a time-consuming and strenuous assembly and disassembly process and make the back cover difficult to replace.

SUMMARY OF THE INVENTION

Thus, an objective of the present invention is to provide a portable electronic module with a back cover changing function for solving the aforesaid problems.

The present invention provides a portable electronic module including a bezel, a glass panel device, a first limiting member, a backlight device, a second limiting member, and a back cover. The glass panel device is fixed onto the bezel. The first limiting member is disposed at a first side of the glass panel device. The backlight device is disposed on the glass panel device. The second limiting member is disposed at a second side of the glass panel device for limiting the backlight device cooperatively with the first limiting member. The back cover covers the backlight device and is detachably connected to the bezel for containing the glass panel device and the backlight device cooperatively with the bezel.

According to the claimed invention, the portable electronic module further includes a protection film covering the backlight device.

According to the claimed invention, the protection film includes a mylar film.

According to the claimed invention, the portable electronic module further includes a host device and at least one shaft member. The host device is electrically connected to the glass panel device and the backlight device. The shaft member is pivotally connected to the host device, the bezel and the back cover, for making the bezel and the back cover capable of rotating relative to the host device.

According to the claimed invention, the back cover has a shaft connecting portion, the bezel has a corresponding shaft covering portion, and the shaft member includes a back-cover connecting portion, a host-device connecting portion, and a pivot portion. The back-cover connecting portion is detachably connected to the shaft connecting portion. The host-device connecting portion is connected to the host device. The pivot portion is connected to the host-device connecting portion and pivotally connected to the back-cover connecting portion. When the back cover is connected to the bezel, the shaft covering portion covers the pivot portion cooperatively with the shaft connecting portion.

According to the claimed invention, the back cover further has a shaft protection cover for covering a side of the shaft connecting portion when the shaft covering portion covers the pivot portion cooperatively with the shaft connecting portion.

According to the claimed invention, the back-cover connecting portion is connected to the shaft connecting portion in a screw-locking manner.

According to the claimed invention, the first limiting member has at least one engaging hole, the bezel has a corresponding hook, and the hook is used for engaging with the engaging hole when the first limiting member is disposed on the glass panel device.

According to the claimed invention, when the hook is engaged with the engaging hole, an edge of the first limiting member and the bezel form a cable containing space cooperatively.

According to the claimed invention, the portable electronic module further includes a buffer frame attached between the glass panel device and the bezel.

According to the claimed invention, the portable electronic module further includes a buffer strip attached between a side of the buffer frame and the glass panel device.

In summary, the portable electronic module provided by the present invention utilizes the design, in which the glass panel device, the limiting members, the backlight device, and other related components (e.g. the protection film and the buffer strip) are assembled onto the bezel sequentially and the back cover is then assembled onto the bezel. Accordingly, the glass panel device, the limiting members, the backlight device, and other related components can be packaged between the back cover and the bezel. In such a manner, if a condition occurs that the back cover is needed to replace (e.g. a user wants to replace the back cover with another back cover of other different color according to his likes) or the back cover is damaged, the present invention allows the user to directly assemble a desired back cover onto the bezel after detaching the back cover from the bezel without additionally performing disassembly of other components. As a result, the back cover changing process of the portable electronic module of the present invention can be quickly completed, so as to solve the aforesaid problem that assembly and disassembly of the back cover is time-consuming and strenuous and the back cover is difficult to replace, as well as improve use flexibility of the portable electronic module in changing the back cover.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
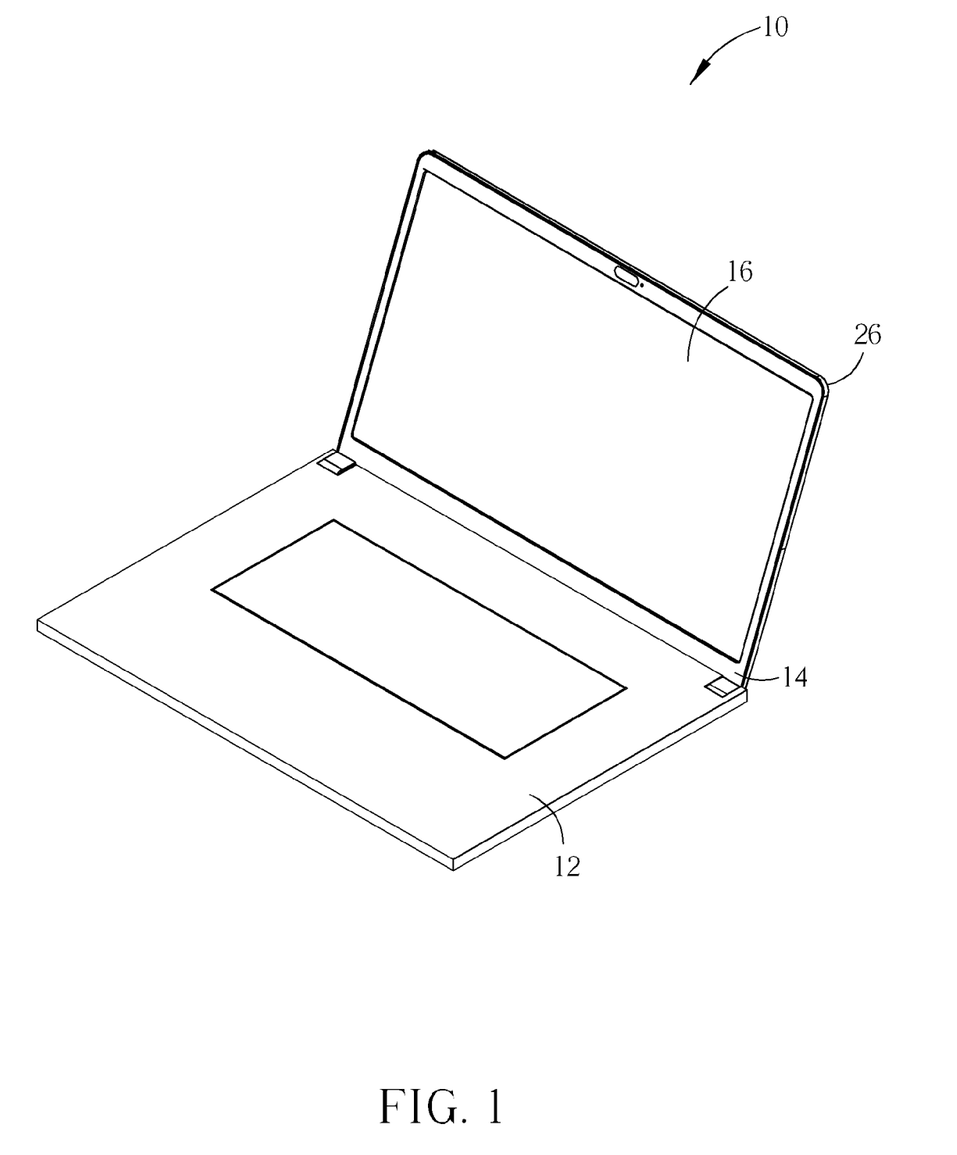
FIG. 1 is a diagram of a portable electronic module according to an embodiment of the present invention.
Figure 2:
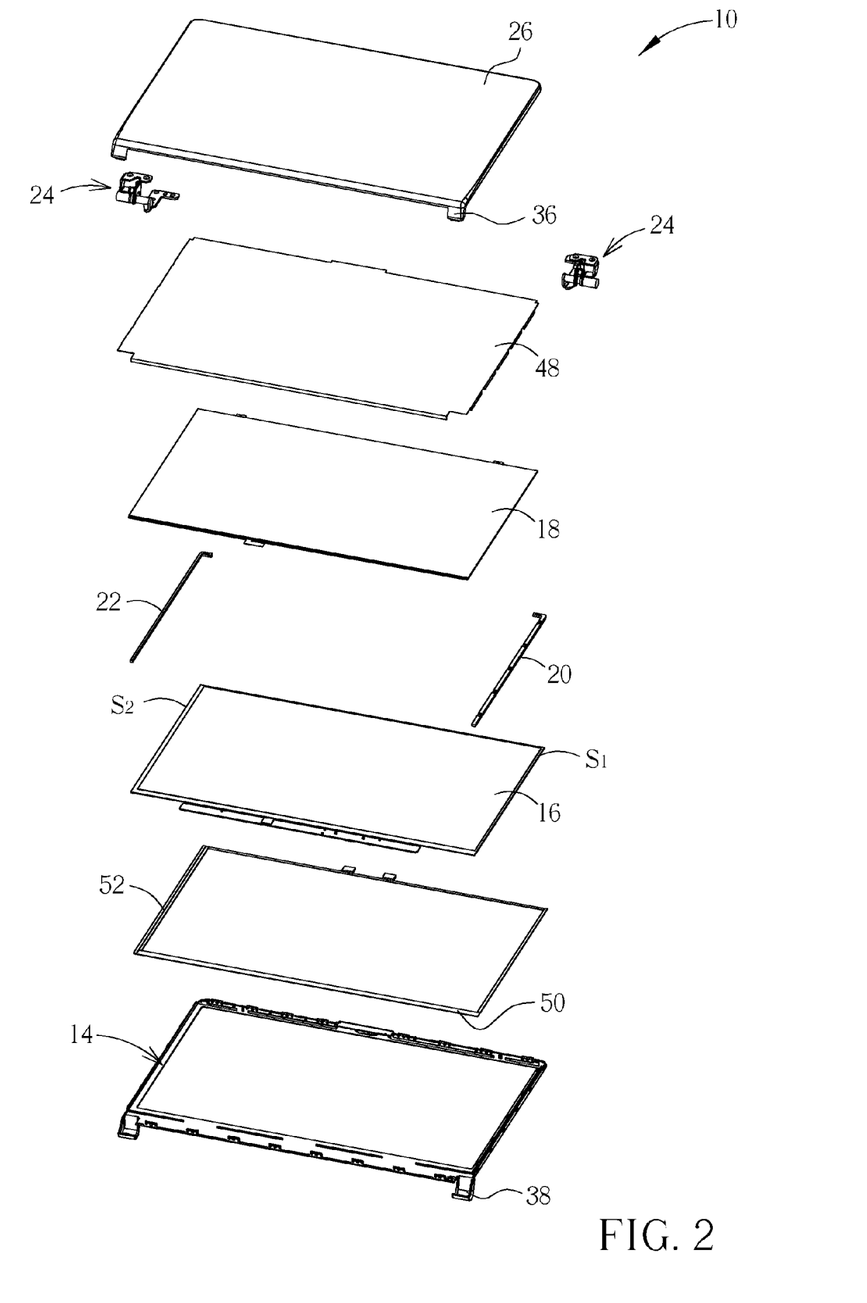
FIG. 2 is a partial exploded diagram of the portable electronic module in FIG. 1.

Please refer to FIG. 1 and FIG. 2. FIG. 1 is a diagram of a portable electronic module 10 according to an embodiment of the present invention. FIG. 2 is a partial exploded diagram of the portable electronic module 10 in FIG. 1. As shown in FIG. 1 and FIG. 2, the portable electronic module 10 includes a host device 12, a bezel 14, a glass panel device 16, a backlight device 18, a first limiting member 20, a second limiting member 22, at least one shaft member 24 (two shown in FIG. 2), and a back cover 26. The host device 12 is electrically connected to the glass panel device 16 and the backlight device 18 for performing display control of the portable electronic module 10. In this embodiment, the host device 12 can include components applied to a conventional computer host, such as a motherboard, a central processing unit, and a keyboard. The glass panel device 16 is fixed onto the bezel 14. The glass panel device 16 includes display components in a conventional liquid crystal module, such as an array substrate and a liquid crystal layer. The backlight device 18 is disposed on the glass panel device 16 for providing uniformly-distributed light to the glass panel device 16. The backlight device 18 includes light processing components in a conventional liquid crystal module, such as a diffusing film, a light guide plate, and a backlight source. In other words, in this embodiment, the backlight device 18 and the glass panel device 16 can form a liquid crystal module with an image display function cooperatively. As for the related configuration for the components in the host device 12, the glass panel device 16 and the backlight device 18, the related description is omitted herein since it is commonly seen in the prior art.

Figure 3:
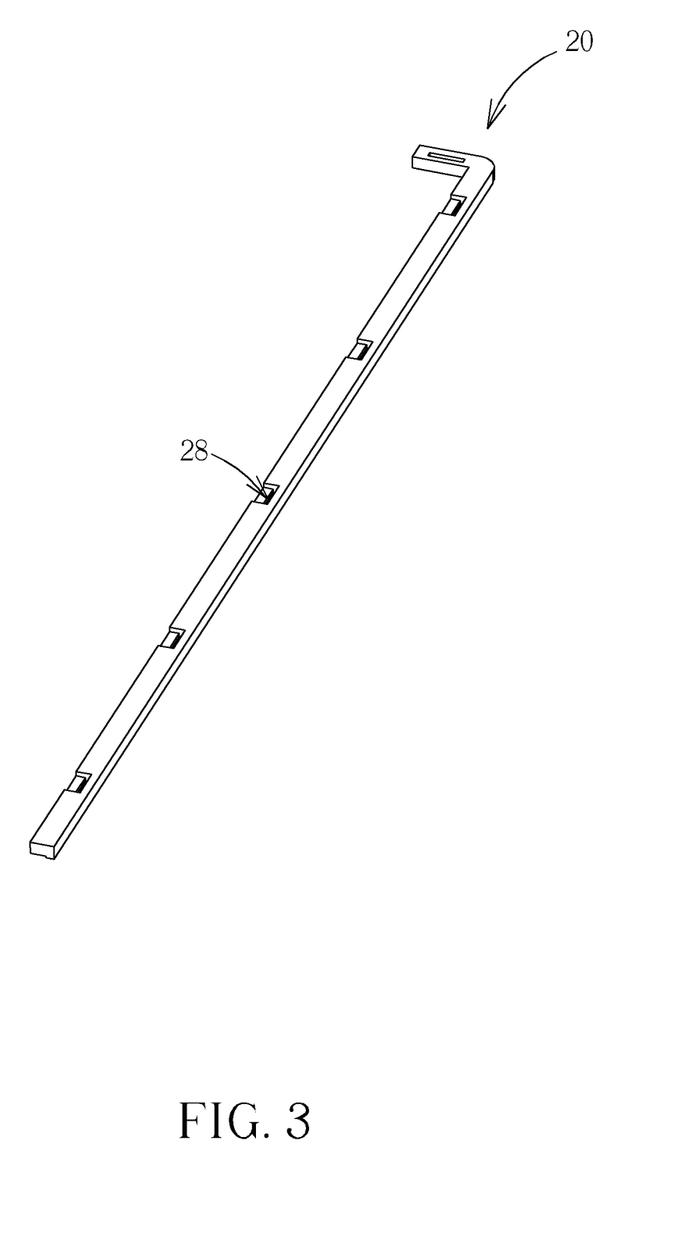
FIG. 3 is an enlarged diagram of a first limiting member in FIG. 2.
Figure 4:
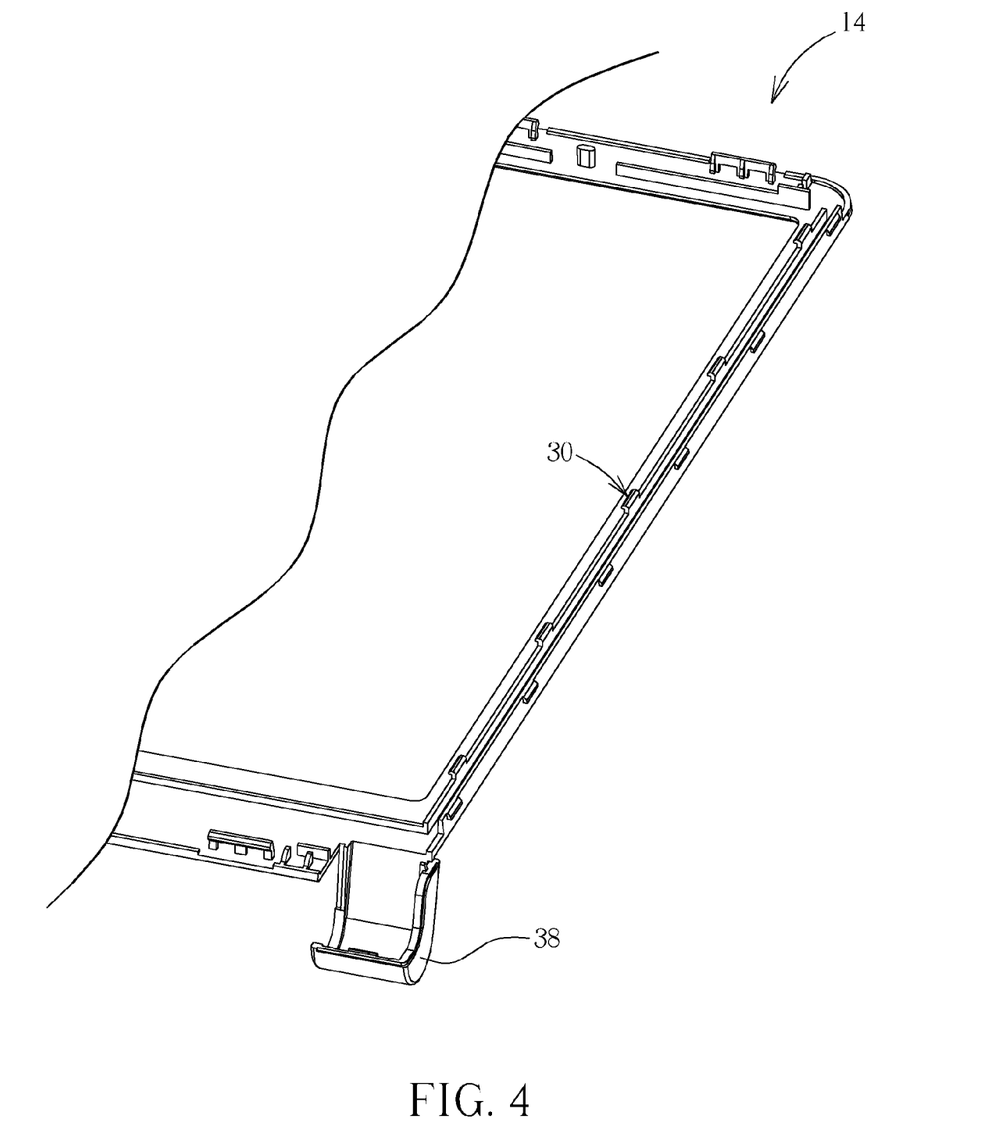
FIG. 4 is a partial enlarged diagram of a bezel in FIG. 2.
Figure 5:
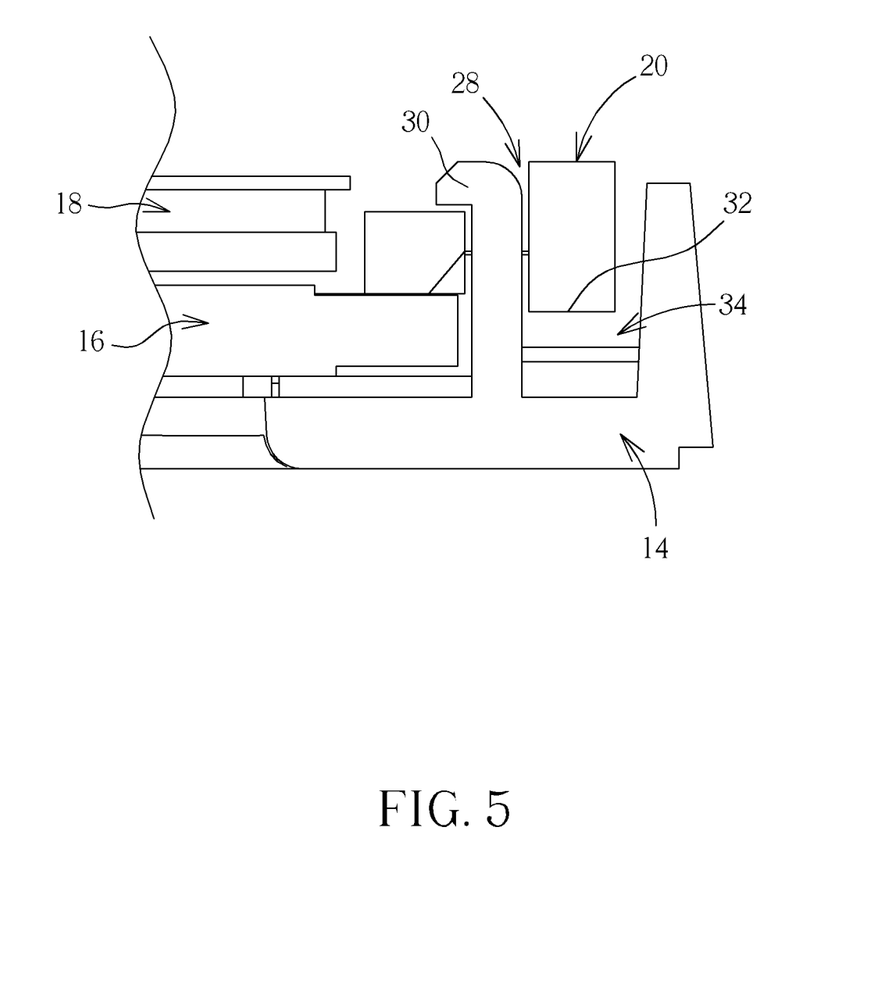
FIG. 5 is a partial sectional diagram of the first limiting member in FIG. 2 fixing a glass panel device cooperatively with the bezel.

The first limiting member 20 is disposed on a first side $S_1$ of the glass panel device 16, and the second limiting member 22 is disposed on a second side $S_2$ of the glass panel device 16. The second limiting member 22 is used for limiting the backlight device 18 cooperatively with the first limiting member 20 when the backlight device 18 is disposed on the glass panel device 16. In such a manner, the backlight device 18 can be disposed on the glass panel device 16 more firmly. To be noted, in this embodiment, the first limiting member 20 is further used for fixing the glass panel device 16 cooperatively with the bezel 14, and the related fixing design can be as shown in FIG. 3, FIG. 4, and FIG. 5. FIG. 3 is an enlarged diagram of the first limiting member 20 in FIG. 2. FIG. 4 is a partial enlarged diagram of the bezel 14 in FIG. 2. FIG. 5 is a partial sectional diagram of the first limiting member 20 in FIG. 2 fixing the glass panel device 16 cooperatively with the bezel 14. As shown in FIG. 3, FIG. 4, and FIG. 5, the first limiting member 20 has at least one engaging hole 28 (five shown in FIG. 3, but not limited thereto), and the bezel 14 has a corresponding hook 30. The hook 30 is used for engaging with the engaging hole 28 when the first limiting member 20 is disposed on the first side $S_1$ of the glass panel device 16, so as to fix the glass panel device 16. In practical application, as shown in FIG. 5, when the hook 30 is engaged with the engaging hole 28, an edge 32 of the first limiting member 20 can form a cable containing space 34 cooperatively with the bezel 14 for containing circuit cables of the glass panel device 16 and the backlight device 18.

Figure 6:
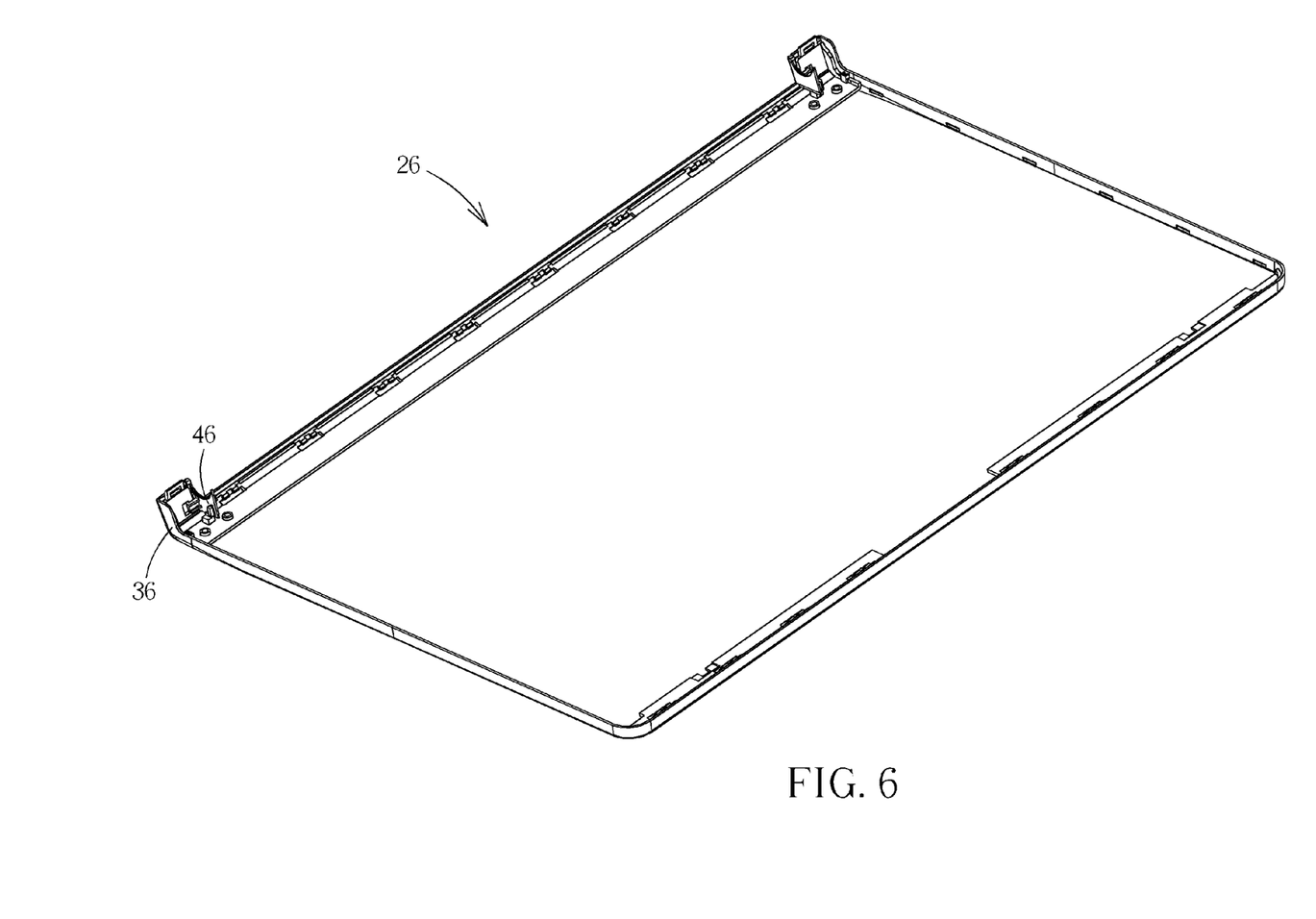
FIG. 6 is an enlarged diagram of a back cover in FIG. 2 at another viewing angle.
Figure 7:
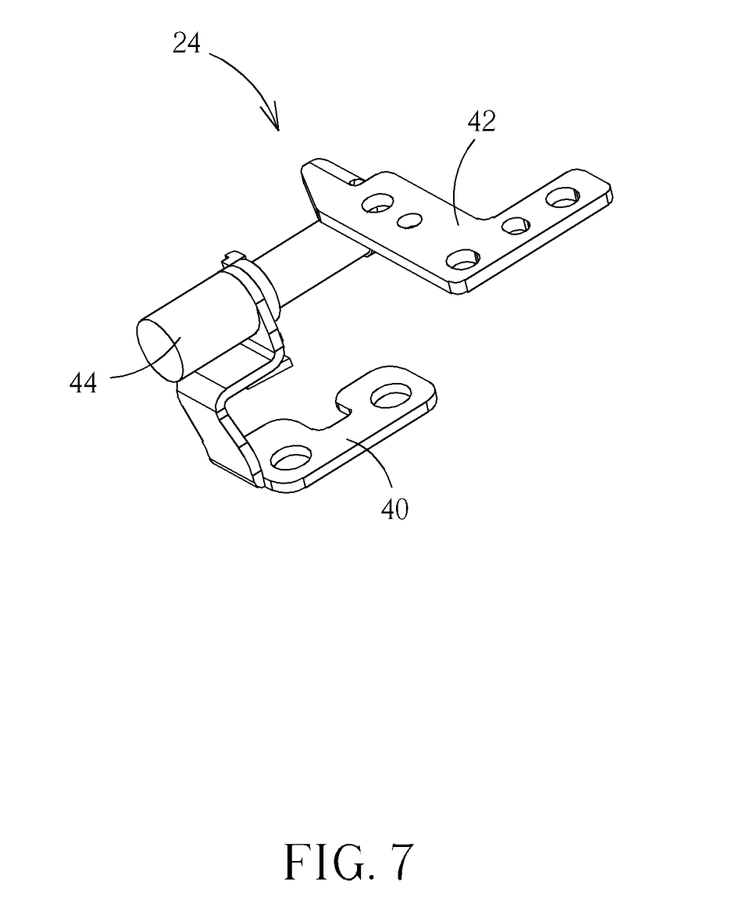
FIG. 7 is an enlarged diagram of a shaft member in FIG. 2 at another viewing angle.

More detailed description for the pivot design of the back cover 26, the host device 12, the bezel 14, and the shaft member 24 is provided as follows. Please refer to FIG. 2, FIG. 6, and FIG. 7. FIG. 6 is an enlarged diagram of the back cover 26 in FIG. 2 at another viewing angle. FIG. 7 is an enlarged diagram of the shaft member 24 in FIG. 2 at another viewing angle. As shown in FIG. 2, FIG. 6, and FIG. 7, the back cover 26 has a shaft connecting portion 36, and the bezel 14 has a corresponding shaft covering portion 38. The shaft member 24 includes a back-cover connecting portion 40, a host-device connecting portion 42, and a pivot portion 44. The back-cover connecting portion 40 is used for detachably connecting to the shaft connecting portion 36. As for the related detachable connecting design, it is commonly seen in the prior art, such as a screw-locking design, and the related description is omitted herein. The host-device connecting portion 42 is used for connecting to the host device 12. The pivot portion 44 is connected to the host-device connecting portion 42 and pivotally connected to the back-cover connecting portion 40. When the back cover 26 is detachably connected to the bezel 14 (e.g. by utilizing screws or an engagement design), the shaft covering portion 38 is used for containing the pivot portion 44 cooperatively with the shaft connecting portion 36. In such a manner, via the said pivot design, the bezel 14 and the back cover 26 can rotate relative to the host device 12. Furthermore, the back cover 26 can further have a shaft protection cover 46. The shaft protection cover 46 is used to cover a side of the shaft connecting portion 36 for protection of the pivot member 24 and achieving the dustproof purpose when the shaft covering portion 38 and the shaft connecting portion 36 contain the pivot portion 44 cooperatively.

Furthermore, for achieving the dustproof and shockproof purposes, the portable electronic module 10 further includes a protection film 48 and a buffer frame 50. The protection film 48 covers the backlight device 18 for providing a dustproof function and preventing light leakage of the portable electronic module 10. The protection film 48 can be a mylar film. The buffer frame 50 is attached between the glass panel device 16 and the bezel 14 by a conventional sticking method (e.g. utilizing twin adhesives) for providing a shockproof function. Furthermore, if the buffer frame 50 can not be attached between the glass panel device 16 and the bezel 14 tightly due to thickness inconsistence among the components of the glass panel device 16 and the bezel 14, the portable electronic module 10 can further include a buffer strip 52 to attach between a side of the buffer frame 50 and the glass panel device 16 for thickness compensation.

Figure 8:
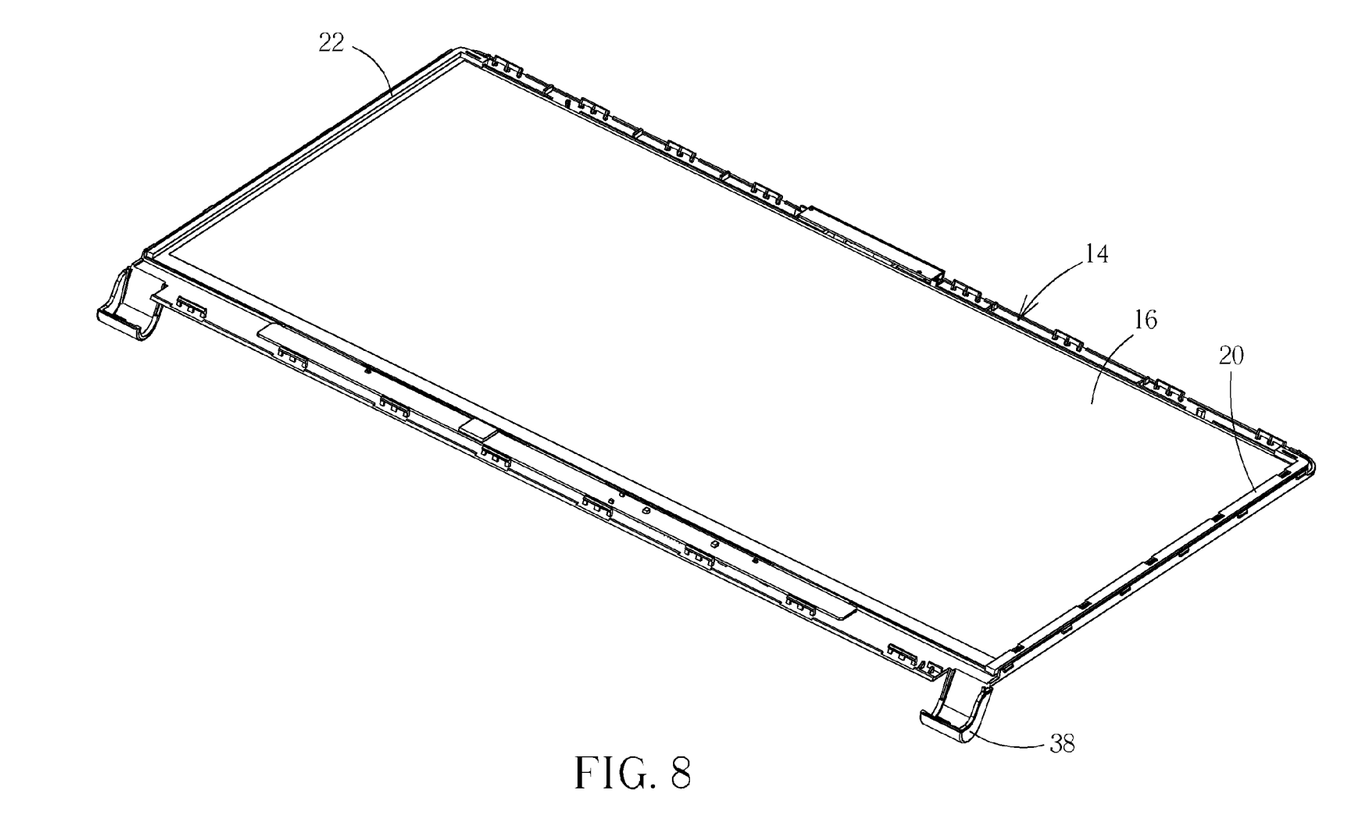
FIG. 8 is an assembly diagram of the glass panel device in FIG. 2 being assembled on the bezel with the first limiting member and a second limiting member.
Figure 9:
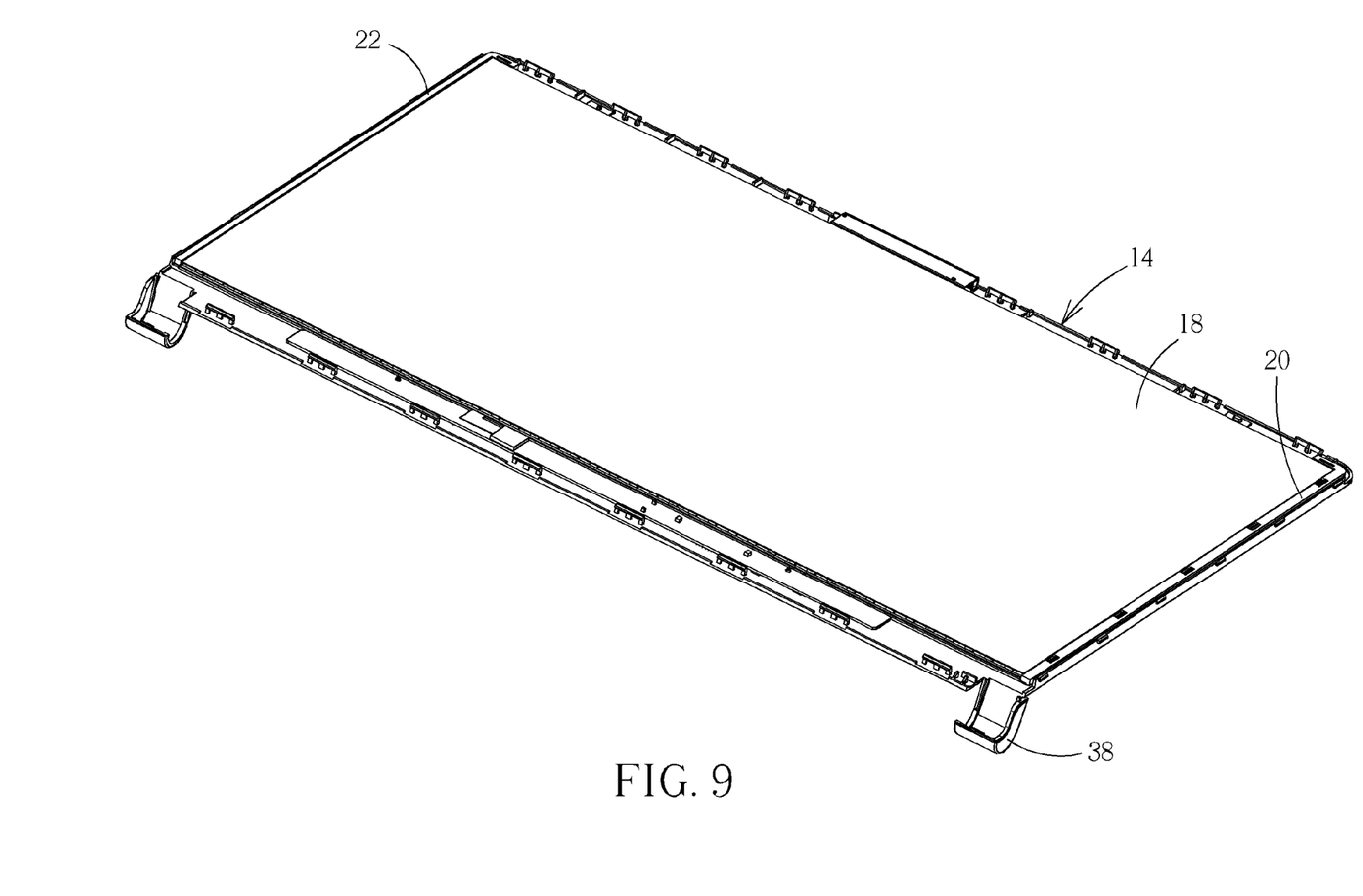
FIG. 9 is an assembly diagram of the first limiting member and the second limiting member in FIG. 8 limiting a backlight device.

In the following, assembly of the portable electronic module 10 and replacement operations of the back cover 26 are described in detail. Please refer to FIG. 2, FIG. 8, and FIG. 9. FIG. 8 is an assembly diagram of the glass panel device 16 in FIG. 2 being assembled on the bezel 14 with the first limiting member 20 and the second limiting member 22. FIG. 9 is an assembly diagram of the first limiting member 20 and the second limiting member 22 in FIG. 8 limiting the backlight device 18. At first, for assembly of the portable electronic module 10, the buffer frame 50, the buffer strip 52, and the glass panel device 16 can be assembled on the bezel 14 sequentially. Subsequently, the first limiting member 20 and the second limiting member 22 can be disposed on the first side $S_1$ and the second side $S_2$ of the glass panel device 16 respectively for cooperatively forming a limiting structure on the glass panel device 16. At this time, as mentioned above, the hook 30 of the bezel 14 can be engaged with the engaging hole 28 of the first limiting member 20 (as shown in FIG. 5)

for fixing the glass panel device 16 onto the bezel 14 firmly. In such a manner, assembly of the bezel 14 and the glass panel device 16 can be completed as shown in FIG. 8, and the overall structural strength of the bezel 14 can be further improved by assembly of the bezel 14 and the glass panel device 16. Accordingly, the bezel 14 can hold following components (e.g. the backlight device 18, the protection film 48, and the back cover 26) desired to dispose thereon steadily.

After completing assembly of the bezel 14 and the glass panel device 16 as shown in FIG. 8, the backlight device 18 can be disposed on the glass panel device 16 and then be limited by the first limiting member 20 and the second limiting member 22 (as shown in FIG. 9). Subsequently, the protection film 48 can cover the backlight device 18 for packaging the backlight device 18 and the glass panel device 16 on the bezel 14. After connecting the shaft member 24 to the back cover 26 by connection of the back-cover connecting portion 40 and the shaft connection portion 36 according to the aforesaid connection design, the back cover 26 can cover the protection film 48 and be connected to the bezel 14. At the same time, the shaft covering portion 38 contains the pivot portion 44 cooperatively with the shaft connecting portion 36, and then the shaft protection cover 46 covers a side of the shaft connecting portion 36. Accordingly, the assembly process of the back cover 26, the backlight device 18, the glass panel device 16, and the bezel 14 can be completed. Finally, after utilizing the host-device connecting portion 42 of the shaft member 24 to be pivoted to the host device 12, assembly of the portable electronic module 10 can be completed (as shown in FIG. 1).

After completing assembly of the portable electronic module 10, there is only the back-cover connecting portion 40 of the shaft member 24 needed to be detached from the shaft connecting portion 36 of the back cover 26 if a condition occurs that the back cover 26 is needed to replace (e.g. a user wants to replace the back cover 26 with another back cover of other different color according to his likes) or the back cover 26 is damaged. In other words, the back cover 26 can be directly detached from the bezel 14 without additionally disassembling other components from the bezel 14. Subsequently, a desired back cover can be connected to the back-cover connecting portion 40 of the shaft member 24 instead of the back cover 26 and then be assembled with the bezel 14. Accordingly, the back cover changing process of the portable electronic module 10 can be completed quickly.

It should be mentioned that the host device 12 and the shaft member 24 can be an omissible component for simplifying the structural design of the portable electronic module 10. For example, the host device 12 can be integrated into the portable electronic module 10 and the shaft member 24 can be omitted, so that the portable electronic module 10 can be a flat electronic module (e.g. a tablet computer) rather than the foldable electronic module as shown in FIG. 1. In another example, the portable electronic module 10 can only be a liquid crystal module without the host device 12 and the shaft member 24. As for which design is utilized, it depends on the practical application of the portable electronic module 10.

Compared with the prior art utilizing the design that the modularized liquid crystal module, the related components and the bezel are assembled onto the back cover sequentially, the portable electronic module provided by the present invention utilizes the design instead, in which the glass panel device, the limiting members, the backlight device, and other related components (e.g. the protection film and the buffer strip) are assembled onto the bezel sequentially and the back cover is then assembled onto the bezel. Accordingly, the glass panel device, the limiting members, the backlight device, and other related components can be packaged between the back cover and the bezel. In such a manner, if a condition occurs that the back cover is needed to replace (e.g. a user wants to replace the back cover with another back cover of other different color according to his likes) or the back cover is damaged, the present invention allows the user to directly assemble a desired back cover onto the bezel after detaching the back cover from the bezel without additionally performing disassembly of other components. As a result, the back cover changing process of the portable electronic module of the present invention can be quickly completed, so as to solve the aforesaid problem that assembly and disassembly of the back cover is time-consuming and strenuous and the back cover is difficult to replace, as well as improve use flexibility of the portable electronic module in changing the back cover.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic module with a back cover changing function, the portable electronic module comprising:
    a bezel;
    a glass panel device fixed onto the bezel;
    a first limiting member fixed at a first side of the glass panel device;
    a second limiting member fixed at a second side of the glass panel device to form a containing space on the glass panel device cooperatively with the first limiting member;
    a backlight device horizontally constrained between the first limiting member and the second limiting member on the glass panel device and movably disposed in the containing space in a normal direction of the glass panel device; and
    a back cover covering the backlight device and detachably connected to the bezel without fixing to the backlight device, the first limiting member, and the second limiting member, so as to be directly detached from the bezel without additionally performing disassembly of the backlight device, the first limiting member, and the second limiting member, for containing the glass panel device and the backlight device cooperatively with the bezel.

2. The portable electronic module of claim 1, further comprising:
    a protection film covering the backlight device.

3. The portable electronic module of claim 1, further comprising:
    a host device electrically connected to the glass panel device and the backlight device; and
    at least one shaft member pivotally connected to the host device, the bezel and the back cover, for making the bezel and the back cover capable of rotating relative to the host device.

4. The portable electronic module of claim 3, wherein the back cover has a shaft connecting portion, the bezel has a corresponding shaft covering portion, and the shaft member comprises:
    a back-cover connecting portion detachably connected to the shaft connecting portion;
    a host-device connecting portion connected to the host device; and
    a pivot portion connected to the host-device connecting portion and pivotally connected to the back-cover connecting portion;

wherein when the back cover is connected to the bezel, the shaft covering portion covers the pivot portion cooperatively with the shaft connecting portion.

5. The portable electronic module of claim 4, wherein the back cover further has a shaft protection cover for covering a side of the shaft connecting portion when the shaft covering portion covers the pivot portion cooperatively with the shaft connecting portion.

6. The portable electronic module of claim 4, wherein the back-cover connecting portion is connected to the shaft connecting portion in a screw-locking manner.

7. The portable electronic module of claim 1, wherein the first limiting member has at least one engaging hole, the bezel has a corresponding hook, and the hook is used for engaging with the engaging hole when the first limiting member is disposed on the glass panel device.

8. The portable electronic module of claim 7, wherein when the hook is engaged with the engaging hole, and an edge of the first limiting member and the bezel form a cable containing space cooperatively.

9. The portable electronic module of claim 1, further comprising:
a buffer frame attached between the glass panel device and the bezel.

10. The portable electronic module of claim 9, further comprising:
a buffer strip attached between a side of the buffer frame and the glass panel device.

\* \* \* \* \*